United States Patent
Onishi et al.

(10) Patent No.: US 11,363,431 B2
(45) Date of Patent: Jun. 14, 2022

(54) WIRELESS COMMUNICATION DEVICE, WORK VEHICLE AND WORK VEHICLE WIRELESS COMMUNICATION SYSTEM

(71) Applicant: TADANO LTD., Kagawa (JP)

(72) Inventors: Kazuhisa Onishi, Kagawa (JP); Daisuke Shinohara, Kagawa (JP)

(73) Assignee: TADANO LTD., Kagawa (JP)

( * ) Notice: Subject to any disclaimer, the term of this patent is extended or adjusted under 35 U.S.C. 154(b) by 97 days.

(21) Appl. No.: 16/962,688

(22) PCT Filed: Jan. 24, 2019

(86) PCT No.: PCT/JP2019/002224
§ 371 (c)(1),
(2) Date: Jul. 16, 2020

(87) PCT Pub. No.: WO2019/146679
PCT Pub. Date: Aug. 1, 2019

(65) Prior Publication Data
US 2020/0367038 A1    Nov. 19, 2020

(30) Foreign Application Priority Data

Jan. 26, 2018 (JP) .............................. JP2018-011078

(51) Int. Cl.
*H04W 4/44* (2018.01)
*G07C 5/00* (2006.01)
(Continued)

(52) U.S. Cl.
CPC .............. *H04W 4/44* (2018.02); *G07C 5/008* (2013.01); *H04Q 9/00* (2013.01); *H04W 8/26* (2013.01)

(58) Field of Classification Search
CPC ......... G06F 21/31; H04W 4/70; G06Q 20/10; H04L 45/306; H04L 47/425; H04L 45/20
See application file for complete search history.

(56) References Cited

U.S. PATENT DOCUMENTS 9,349,223 B1    5/2016 Palmer
2012/0294238 A1  11/2012 Uhler
(Continued)

FOREIGN PATENT DOCUMENTS

| JP | 2004-161255 A | 6/2004 |
| JP | 2014-042508 A | 3/2014 |

(Continued)

OTHER PUBLICATIONS

Mar. 26, 2019, International Search Report issued for related PCT Application No. PCT/JP2019/002224.
(Continued)

*Primary Examiner* — Iqbal Zaidi
(74) *Attorney, Agent, or Firm* — Paratus Law Group, PLLC

(57) ABSTRACT

This wireless communication device is equipped with: a communication control unit for wirelessly connecting a work vehicle and a portable terminal with one another, an acquisition unit which is connected to a work vehicle onboard network, and acquires, from the work vehicle, work vehicle identification information for identifying the work vehicle; a generation unit for generating first character string data on the basis of the work vehicle identification information; and a setting unit for setting the generated first character string data to as a network name the communication control unit.

14 Claims, 3 Drawing Sheets

(51) Int. Cl.
 *H04Q 9/00* (2006.01)
 *H04W 8/26* (2009.01)

(56) References Cited

U.S. PATENT DOCUMENTS

| | | | |
|---|---|---|---|
| 2014/0189814 A1* | 7/2014 | Marten | G07C 5/008 |
| | | | 726/4 |
| 2015/0025766 A1 | 1/2015 | Mederer et al. | |
| 2016/0087881 A1* | 3/2016 | Ge | H04L 45/42 |
| | | | 709/244 |
| 2017/0156062 A1* | 6/2017 | Dieckmann | H04W 12/50 |

FOREIGN PATENT DOCUMENTS

| | | |
|---|---|---|
| JP | 2014-194603 A | 10/2014 |
| JP | 2015-192330 A | 11/2015 |
| JP | 2017-216744 A | 12/2017 |

OTHER PUBLICATIONS

Mar. 26, 2019, International Search Opinion issued for related PCT Application No. PCT/JP2019/002224.
Oct. 8, 2021, European Search Report issued for related EP Application No. 19744155.3.

* cited by examiner

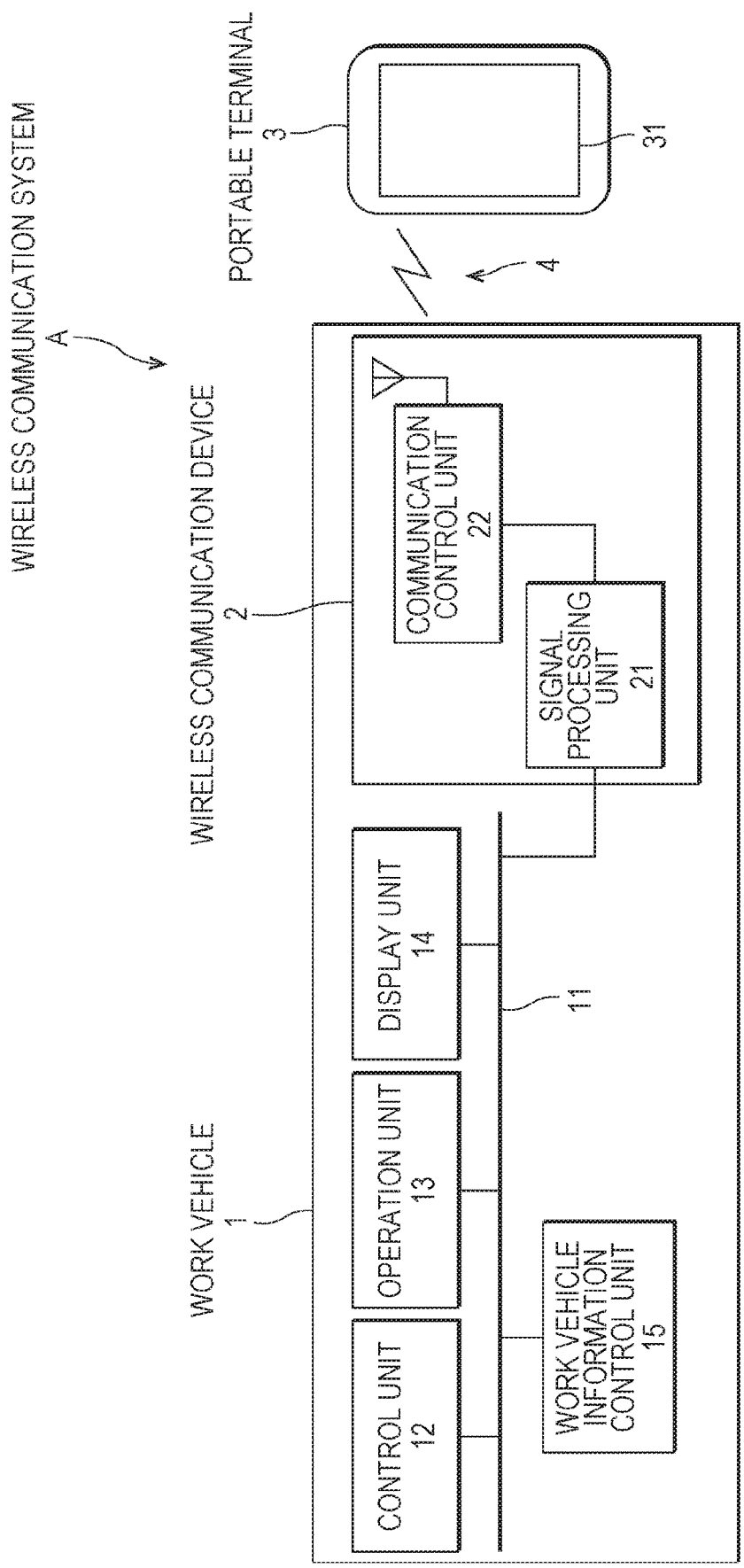

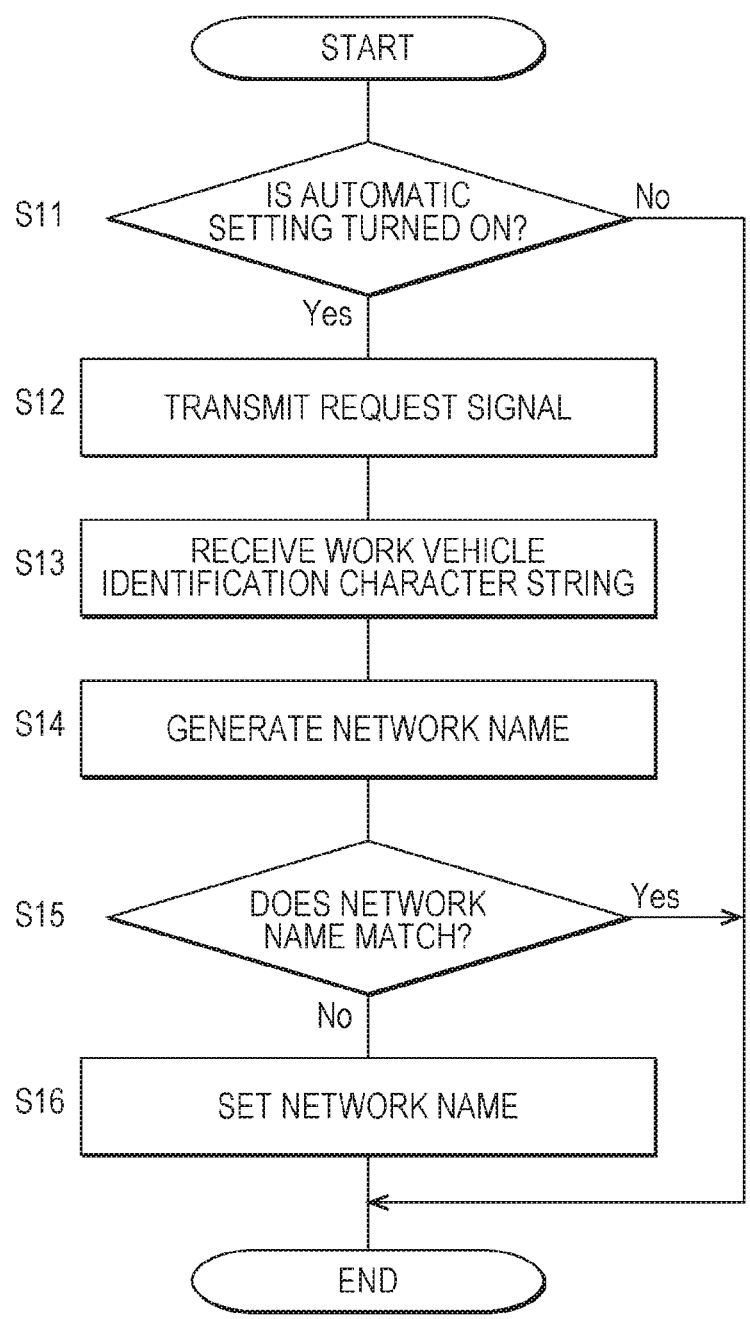

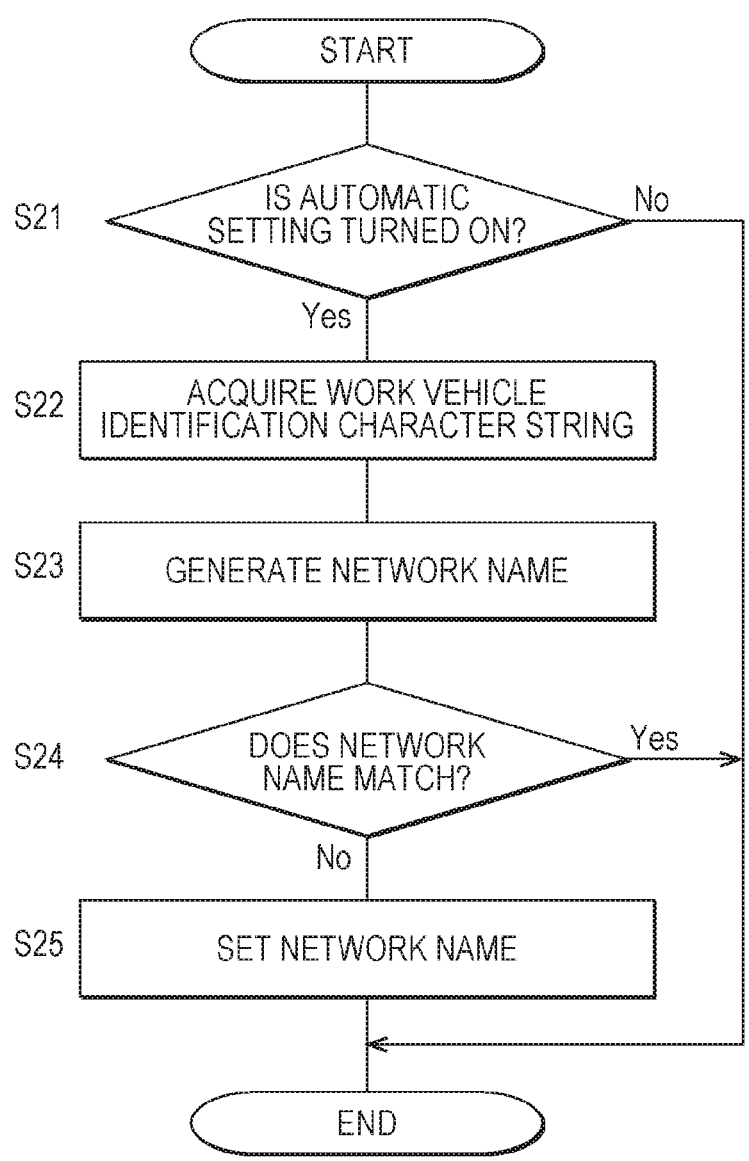

WIRELESS COMMUNICATION DEVICE, WORK VEHICLE AND WORK VEHICLE WIRELESS COMMUNICATION SYSTEM

CROSS REFERENCE TO PRIOR APPLICATION

This application is a National Stage Patent Application of PCT International Patent Application No. PCT/JP2019/002224 (filed on Jan. 24, 2019) under 35 U.S.C. § 371, which claims priority to Japanese Patent Application No. 2018-011078 (filed on Jan. 26, 2018), which are all hereby incorporated by reference in their entirety.

TECHNICAL FIELD

The present invention relates to a wireless communication device, a work vehicle, and a wireless communication system of the work vehicle.

BACKGROUND ART

Patent Literature 1 discloses a system for performing wireless communication between a work machine and a portable terminal. This system establishes wireless communication between an access point device provided on the work machine and the portable terminal. A network name (SSID) is set in the access point device. When a user designates an SSID on the portable terminal, the wireless communication between the access point device corresponding to this SSID and the portable terminal can be established.

CITATION LIST

Patent Literature

Patent Literature 1: JP 2014-42508 A

SUMMARY OF THE INVENTION

Problems to be Solved by the Invention

In the system of Patent Literature 1, the user of the portable terminal needs to know the SSID of the access point device provided in the target work machine. If the user does not know the SSID, the wireless communication between the work machine and the portable terminal cannot be established and the system cannot be used.

In general, a character string that identifies the access point device itself is set in the SSID. Therefore, the SSID cannot specify the work machine provided with the access point device. Therefore, it is difficult for the user to know which SSID should be selected for wireless communication with a target work machine, especially when there are a plurality of work machines.

An object of the invention is to provide a wireless communication device, a work vehicle, and a wireless communication system for the work vehicle, which can easily set the wireless communication between the work vehicle and the portable terminal.

Solutions to Problems

An aspect of a wireless communication device according to the invention includes a communication control unit that wirelessly connects a work vehicle and a portable terminal, an acquisition unit that is connected to an onboard network of the work vehicle and acquires work vehicle identification information for identifying the work vehicle from the work vehicle, a generation unit that generates first character string data based on the work vehicle identification information, and a setting unit that sets the generated first character string data to the communication control unit as a network name.

An aspect of a work vehicle according to the invention includes a work vehicle main body that includes an onboard network and a storage unit that is connected to the onboard network and stores work vehicle identification information for identifying the work vehicle, and the above-mentioned wireless communication device.

An aspect of a wireless communication system for a work vehicle according to the invention includes the above-mentioned work vehicle and a portable terminal wirelessly connected to the work vehicle via a wireless communication device.

Effects of the Invention

According to the invention, it is possible to provide a wireless communication device, a work vehicle, and a wireless communication system for the work vehicle, which can easily set wireless communication between the work vehicle and a portable terminal.

BRIEF DESCRIPTION OF DRAWINGS

FIG. 1 is a block diagram of a wireless communication system according to a first embodiment of the invention.

FIG. 2 is a flowchart illustrating a setting process of a network name by the wireless communication device in a first embodiment.

FIG. 3 is a flowchart illustrating a setting process of a network name by a wireless communication device in a second embodiment.

DESCRIPTION OF EMBODIMENTS

Next, embodiments of the invention will be described with reference to the drawings.

First Embodiment

As illustrated in FIG. 1, a wireless communication system A according to a first embodiment of the invention is a system for performing wireless communication between a work vehicle 1 and a portable terminal 3. Examples of the work vehicle 1 include mobile cranes, aerial work vehicles, land-rail vehicles, and construction machines such as hydraulic excavators.

(Work Vehicle)

First, the configuration of the work vehicle 1 will be described.

The work vehicle 1 has an onboard network 11. The number of onboard networks 11 of the work vehicle 1 is not particularly limited and may be one or plural. Further, portions of the work vehicle 1 other than the elements of the wireless communication device 2 described later may be regarded as an example of the work vehicle main body.

Various onboard devices mounted on the work vehicle 1 are connected to the onboard network 11. The onboard network 11 is configured by communication lines that connect a plurality of onboard devices to each other. The communication protocol of the onboard network 11 is not particularly limited, and examples thereof include Controller Area Network (CAN), Local Interconnect Network (LIN), and Flex Ray.

The onboard devices connected to the onboard network 11 include a control unit 12, an operation unit 13, and a display unit 14. Other onboard devices include various sensors.

The control unit 12 is an onboard computer including a CPU and a memory. The control unit 12 has a function of controlling a device mounted on the work vehicle 1. The number of control units 12 is not limited to one. A plurality of control units 12 may be provided for each function. Examples of the control units 12 include a control unit that controls a crane device of a mobile crane, a control unit that controls an engine for in-vehicle driving of the mobile crane, and a control unit of an overload prevention device.

The operation unit 13 is a switch, a lever, a pedal, or the like used to operate a device or the like mounted on the work vehicle 1. The operation unit 13 is provided in a driver's cab or the like of the work vehicle 1. The number of operation units 13 is not particularly limited, and may be one or plural. Examples of the operation unit 13 include a lever used to operate the crane device, an accelerator pedal used to operate the vehicle running, a brake pedal, and a vehicle system switch. The vehicle system switches include a suspension level setting switch, a drive changeover switch, and a steering mode changeover switch.

The display unit 14 is configured by a liquid crystal display or the like. The display unit 14 is provided in the driver's cab of the work vehicle 1 or the like. The number of the display unit 14 is not particularly limited, and may be one or plural. Examples of the display unit 14 include a display of an overload prevention device and a combination meter for running a vehicle.

The operation unit 13 is connected to the control unit 12 via the onboard network 11. When a worker operates the operation unit 13, a specific operation signal is output from the operation unit 13 to the onboard network 11. The operation signal is input to the control unit 12 via the onboard network 11. The control unit 12 controls devices and the like mounted on the work vehicle 1 based on the operation signal. As a result, a worker can operate the work vehicle 1 using the operation unit 13.

The display unit 14 is connected to the control unit 12 via the onboard network 11. The control unit 12 outputs an information signal indicating various information of the work vehicle 1 to the onboard network 11. The information signal is input to the display unit 14 via the onboard network 11. The display unit 14 displays various information of the work vehicle 1 based on the information signal. Thereby, the worker can grasp the state of the work vehicle 1 through the display unit 14.

In this way, the plurality of onboard devices connected to the onboard network 11 exchange signals with each other to perform various controls and processes. Here, the signal transmitted/received via the onboard network 11 is called an "in-vehicle signal". The in-vehicle signal includes the above-mentioned operation signal, information signal, and other signals.

A work vehicle information control unit 15 is connected to the onboard network 11. The work vehicle information control unit 15 is an onboard computer including a CPU and a memory. The work vehicle information control unit 15 has at least a function of transmitting a work vehicle identification character string described later. The work vehicle information control unit 15 may have only this function, or may have other functions in addition to this function. The control unit 12 may have a function as the work vehicle information control unit 15.

The work vehicle information control unit 15 stores a work vehicle identification character string in advance. Here, the "work vehicle identification character string" is a character string used to identify the work vehicle 1. The work vehicle identification character string corresponds to an example of identification information. Examples of the work vehicle identification character string include the production number, product name, product type, specification number, vehicle identification number (VIN), customer number, and registration number of the work vehicle 1. Here, the production number is a unique number (serial number) given when the work vehicle 1 is manufactured. The product name is a name that identifies the model of the work vehicle 1. The product type is a symbol given to products having the same structure, device, performance and the like. The specification number is a symbol assigned to each group by grouping products by performance. The vehicle identification number (VIN) is a unique number assigned to the vehicle of the work vehicle 1. The customer number is a number arbitrarily set by the customer for the work vehicle 1. The registration number is the license plate number of the work vehicle 1.

(Wireless Communication Device)

Next, the configuration of the wireless communication device 2 provided in the work vehicle 1 will be described.

The wireless communication device 2 is connected to the onboard network 11 of the work vehicle 1. When the work vehicle 1 has a plurality of onboard networks 11, the wireless communication device 2 may be connected to a plurality of the onboard networks 11. Further, it is not necessary to connect the wireless communication device 2 to all the onboard networks 11 of the work vehicle 1. The wireless communication device 2 may be connected to a part of the plurality of onboard networks 11 included in the work vehicle 1.

The wireless communication device 2 is physically removable from the onboard network 11 and is connected to the onboard network 11 only when necessary. For example, the wireless communication device 2 has a connector. The wireless communication device 2 can be attached/detached by connecting/disconnecting the connector on the wireless communication device 2 side and the connector on the onboard network 11 side. The wireless communication device 2 may be made non-detachable and may always be connected to the onboard network 11. That is, the wireless communication device 2 may be incorporated in the work vehicle 1.

As a power line for supplying power to the wireless communication device 2, for example, an accessory line of the work vehicle 1 can be used. Then, the power of the battery mounted on the work vehicle 1 is supplied to the wireless communication device 2 by a key operation for starting the engine.

The wireless communication device 2 includes a signal processing unit 21 and a communication control unit 22. Each of the signal processing unit 21 and the communication control unit 22 may be configured by hardware such as an electronic circuit, or a part of the functions thereof may be configured by software.

The signal processing unit 21 is connected to the onboard network 11. The signal processing unit 21 transmits/receives signals to/from various onboard devices (the control unit 12, the operation unit 13, the display unit 14, and the work vehicle information control unit 15) via the onboard network 11.

The communication control unit 22 controls wireless communication with the portable terminal 3. The communication control unit 22 has a function as an access point in a wireless Local Area Network (LAN). In the communication control unit 22, a network name (SSID: Service Set Identifier) used for wireless communication, an encryption key (network key), and the like are set.

By establishing communication between the communication control unit 22 and the portable terminal 3, the wireless communication device 2 and the portable terminal 3 are wirelessly connected. Hereinafter, the network established between the wireless communication device 2 and the portable terminal 3 is referred to as a wireless network 4.

The communication control unit 22 transmits and receives signals to and from the portable terminal 3. At this time, the communication control unit 22 performs conversion processing between the communication protocol of the onboard network 11 and the communication protocol of the wireless network 4.

For example, the communication control unit 22 transmits the in-vehicle signal acquired by the signal processing unit 21 from the onboard network 11 to the portable terminal 3. Further, the communication control unit 22 outputs the signal received from the portable terminal 3 to the onboard network 11 via the signal processing unit 21.

(Portable Terminal)

Next, the configuration of the portable terminal 3 will be described.

The portable terminal 3 is a general-purpose computer including a CPU and a memory. The portable terminal 3 has a wireless communication function. The portable terminal 3 is, for example, a personal computer, a tablet terminal, or a high-performance mobile phone (smartphone). The portable terminal 3 can be arranged outside the driver's cab of the work vehicle 1. The portable terminal 3 has a display unit 31. The display unit 31 is a liquid crystal display or the like.

An application using wireless communication with the work vehicle 1 is installed in the portable terminal 3. An example of this type of application is a display application that displays information about the work vehicle 1 based on the received in-vehicle signal. Information on the work vehicle 1 is displayed on the display unit 31. Further, an operation application for remotely operating the work vehicle 1 may be installed on the portable terminal 3. The worker can operate the work vehicle 1 remotely by operating the portable terminal 3 and executing the operation application.

(Operation of Wireless Communication System)

Next, the operation of the wireless communication system A will be described.

The wireless communication system A has a feature that a work vehicle identification character string is used as a network name used for wireless communication with the portable terminal 3. The details will be described below based on the flowchart illustrated in FIG. 2.

First, the power source of the wireless communication device 2 is turned on. For example, the power of the battery mounted on the work vehicle 1 is supplied to the wireless communication device 2 by a key operation for starting the engine of the work vehicle 1. After that, the wireless communication device 2 executes a network name setting process.

In the communication control unit 22, whether to automatically set the network name is set in advance. This setting can be changed (selected) by a worker using a switch provided in the wireless communication device 2 or other selection means. When the worker wants to use the work vehicle identification character string as the network name, the automatic setting is set to ON (also referred to as the first mode of the wireless communication device 2). On the other hand, when the worker wants to use the network name defined independently (in other words, second character string data preset in the wireless communication device 2), the automatic setting is set to OFF (also referred to as a second mode of the wireless communication device 2).

In other words, the wireless communication device 2 uses the character string (also referred to as first character string data) generated based on the work vehicle identification character string acquired from the work vehicle information control unit 15 as the network name in the first mode, and a second mode in which a character string (also referred to as second character string data) preset in the wireless communication device 2 is used as a network name. The wireless communication device 2 has a selection unit (not illustrated) capable of selecting the first mode and the second mode. The wireless communication device 2 may be configured to have only the first mode. In this case, the wireless communication device 2 does not have to have the selection unit.

Further, the wireless communication device 2 may automatically switch between the first mode and the second mode. Specifically, the wireless communication device 2 may automatically change from the first mode to the second mode when the work vehicle identification character string cannot be received from the work vehicle 1 (specifically, the work vehicle information control unit 15). When such a configuration is adopted, the above selection unit may be omitted.

The first character string data may be, as an example, data of only the work vehicle identification character string acquired from the work vehicle information control unit 15, data of a character string obtained by adding other character strings to the work vehicle identification character string acquired from the work vehicle information control unit 15, or data of a character string obtained by subtracting a part of a character string from the work vehicle identification character string acquired from the work vehicle information control unit 15. The communication control unit 22 confirms ON/OFF of the automatic setting (Step S11).

When the automatic setting is OFF (No in Step S11), the wireless communication device 2 ends the network name setting process. In this case, the communication control unit 22 uses a preset network name for wireless communication.

When the automatic setting is ON (Yes in Step S11), the signal processing unit 21 transmits a request signal to the work vehicle information control unit 15 via the onboard network 11 (Step S12). Here, the request signal is a signal requesting the work vehicle information control unit 15 to transmit the work vehicle identification character string. The signal processing unit 21 corresponds to an example of an acquisition unit.

Before acquiring the work vehicle identification character string, the wireless communication device 2 transmits a request signal for requesting the transmission of the work vehicle identification character string to the work vehicle information control unit 15. The work vehicle information control unit 15 receives the request signal from the wireless communication device 2. In this case, the work vehicle information control unit 15 transmits the stored work vehicle identification character string (also referred to as a response signal) to the wireless communication device 2 via the onboard network 11. Then, the signal processing unit 21 receives the work vehicle identification character string from the work vehicle information control unit 15 (Step S13). In this way, the wireless communication device 2 acquires the work vehicle identification character string from the work vehicle information control unit 15 via the onboard network 11.

The signal processing unit 21 inputs the received work vehicle identification character string to the communication control unit 22. The communication control unit 22 generates a new network name based on the input work vehicle identification character string (Step S14). As an example, the new network name may be a character string including a work vehicle identification character string. The new network name may be the work vehicle identification character string itself, or may be the work vehicle identification character string to which another character string is added. Alternatively, the new network name may be a character string obtained by removing a part of the character string from the work vehicle identification character string. Further, the new network name may be a character string generated based on the work vehicle identification character string so that the worker can more easily identify the work vehicle. The communication control unit 22 may be regarded as an example of the generation unit.

Next, the communication control unit 22 compares the generated new network name with the currently set network name (Step S15). For example, when the wireless communication device 2 is connected to the onboard network 11 and then the power source of the wireless communication device 2 is turned on for the first time, the two network names do not match. After connecting the wireless communication device 2 to the onboard network 11, when the power source of the wireless communication device 2 is turned on for the second time or later, both network names match.

When the new network name and the currently set network name match (Yes in Step S15), the wireless communication device 2 ends the network name setting process.

When the new network name and the currently set network name do not match (No in Step S15), the communication control unit 22 sets the new network name (a character string including the work vehicle identification character string) as the network name (Step S16). The communication control unit 22 may be regarded as an example of the setting unit.

After the network name setting process described above, the wireless communication device 2 and the portable terminal 3 are in a state where wireless communication can be established using the network name set in the wireless communication device 2. This wireless communication is established, for example, in the following procedure.

The communication control unit 22 periodically broadcasts a beacon. The beacon includes various information necessary for establishing wireless communication such as a network name. The portable terminal 3 scans radio waves and receives the beacon. The portable terminal 3 acquires the network name from the received beacon and displays it on the display unit 31. Here, when receiving a plurality of types of beacons (beacons transmitted from a plurality of access points), the portable terminal 3 displays a plurality of network names on the display unit 31.

When the user of the portable terminal 3 specifies one network name, the portable terminal 3 transmits a probe request to the communication control unit 22 corresponding to the network name. The communication control unit 22 that has received the probe request transmits a probe response to the portable terminal 3. As a result, wireless communication is established between the communication control unit 22 and the portable terminal 3.

Here, the network name of the wireless communication device 2 includes the work vehicle identification character string. Generally, the user of the portable terminal 3 knows the work vehicle identification character string, that is, the production number of the work vehicle 1 and the like. Therefore, the user can determine the network to be connected from the work vehicle identification character string even if the user does not particularly store the network name. Further, the work vehicle 1 may have, for example, a production number, and a name plate (not illustrated) on which a product type and the like are described. Such a name plate may be provided at a position such as an outer surface of the vehicle body that is easily visible to the user. The work vehicle identification character string used for the network name of the wireless communication device 2 is preferably a character string relating to the information described on the name plate.

Further, since the work vehicle identification character string is a character string that identifies the work vehicle 1, the user can specify the work vehicle 1 corresponding to the network name from the network name. When there are a plurality of work vehicles 1 on the work site, a plurality of network names are displayed on the display unit 31 of the portable terminal 3. Even in this case, the correspondence between the network name and the work vehicle 1 is clear, and the user can easily understand the network name corresponding to the target work vehicle 1. Therefore, setting of wireless communication between the work vehicle 1 and the portable terminal 3 is easy.

The wireless communication device 2 can be attached to and detached from the work vehicle 1, and may be remounted on another work vehicle 1. Such a wireless communication device 2 may be a wireless unit that can be attached to and detached from the work vehicle 1 via a connector (not illustrated). In the case of such a wireless communication device 2 that can be attached to and detached from the work vehicle 1, the network name of the wireless communication device 2 is automatically changed to the generated character string (in other words, the first character string data) based on the work vehicle identification character string of the work vehicle 1 in which the wireless communication device 2 is newly installed. Therefore, the correspondence between the network name of the wireless communication device 2 and the work vehicle 1 can be maintained even if the worker does not perform a special operation.

The wireless communication device 2 according to this embodiment can also be used by connecting to a work vehicle that does not support the first mode of the wireless communication device 2. In this case, the wireless communication device 2 may be used in the second mode in which a network name preset in the wireless communication device 2 is used.

When the wireless communication device 2 does not receive the response signal after a predetermined time has passed from the transmission of the request signal, the network name preset in the wireless communication device 2 may be used as the network name for wireless communication. If such a configuration is adopted, the wireless communication device 2 according to this embodiment can be used by connecting to a work vehicle that does not support the first mode.

After wireless communication is established between the work vehicle 1 and the portable terminal 3, various processes can be performed using this wireless communication. For example, the wireless communication device 2 transmits an in-vehicle signal flowing through the onboard network 11 to the portable terminal 3. The portable terminal 3 displays information on the work vehicle 1 based on the in-vehicle signal. Then, the portable terminal 3 can confirm the information of the work vehicle 1. The portable terminal 3 can be used as an alternative to the display unit 14.

Further, when the user operates the portable terminal 3, the operation signal is transmitted from the portable terminal 3. The wireless communication device 2 outputs the operation signal to the onboard network 11. The onboard device connected to the onboard network 11 performs processing based on the operation signal. The work vehicle 1 can be remotely controlled using the portable terminal 3. The portable terminal 3 can be used as an alternative to the operation unit 13.

Second Embodiment

Next, a wireless communication system according to the second embodiment of the invention will be described. The configuration of the wireless communication system of this embodiment is the same as that of the wireless communication system A of the first embodiment, and therefore the description thereof is omitted (see FIG. 1).

The network name setting process executed by the wireless communication device 2 of this embodiment will be described based on the flowchart illustrated in FIG. 3.

First, the communication control unit 22 confirms ON/OFF of the automatic setting (Step S21). When the automatic setting is OFF, the wireless communication device 2 ends the network name setting process. In this case, the communication control unit 22 uses a preset network name for wireless communication.

When the automatic setting is ON, the signal processing unit 21 acquires the work vehicle identification character string from the work vehicle information control unit 15 of the onboard network 11 (Step S22). In the case of this embodiment, the work vehicle information control unit 15 periodically outputs the work vehicle identification character string to the onboard network 11. That is, the signal processing unit 21 acquires the work vehicle identification character string periodically output from the work vehicle information control unit 15. Further, the wireless communication device 2 may set the character string preset in the wireless communication device 2 (in other words, the second character string data) as the network name used for wireless communication when the work vehicle identification character string cannot be acquired after a predetermined time has elapsed since the power source of the wireless communication device 2 has turned on.

In this embodiment, the signal processing unit 21 does not need to send a request signal to the work vehicle information control unit 15. Further, the work vehicle information control unit 15 does not need to perform the processing based on the request signal. Therefore, even if the communication of the onboard network 11 is one-way communication from the work vehicle information control unit 15 to the signal processing unit 21, the signal processing unit 21 can acquire the work vehicle identification character string.

Processes in subsequent Steps S23, S24, and S25 are the same as those in Steps S14, S15, and S16 in the first embodiment.

(Notes)

A wireless communication system according to a first reference example includes
a work vehicle that has an onboard network,
a work vehicle information control unit that is connected to the onboard network,
a wireless communication device that is connected to the onboard network, and
a portable terminal that is wirelessly connected to the wireless communication device.

In the case of the wireless communication system according to the first example, the work vehicle information control unit stores a work vehicle identification character string for identifying the work vehicle. Further, the wireless communication device acquires the work vehicle identification character string from the work vehicle information control unit via the onboard network. Then, the wireless communication device sets a character string including the work vehicle identification character string as a network name used for wireless communication with the portable terminal.

Further, in a wireless communication system according to a second reference example,
the wireless communication device in the wireless communication system according to the first reference example transmits a request signal to the work vehicle information control unit,
when the work vehicle identification character string is received from the work vehicle information control unit, a character string including the work vehicle identification character string is set as the network name, and
the work vehicle information control unit transmits the work vehicle identification character string to the wireless communication device when the request signal is received from the wireless communication device.

Further, in the wireless communication system according to a third reference example,
the work vehicle information control unit in the wireless communication system according to the first reference example outputs the work vehicle identification character string to the onboard network, and the wireless communication device acquires the work vehicle identification character string from the onboard network, and sets a character string including the work vehicle identification character string as the network name.

The entire contents of specification, drawings, and abstract contained in Japanese Patent Application No. 2018-011078, filed on Jan. 26, 2018 are incorporated herein.

REFERENCE SIGNS LIST

A wireless communication system
1 work vehicle
11 onboard network
15 work vehicle information control unit
2 wireless communication device
21 signal processing unit
22 communication control unit
3 portable terminal

The invention claimed is:
1. A wireless communication device, comprising:
a communication control unit that wirelessly connects a work vehicle and a portable terminal;
an acquisition unit in connection with an onboard network of the work vehicle, that acquires work vehicle identification information for identifying the work vehicle from the work vehicle;
a generation unit that generates first character string data based on the work vehicle identification information;
a setting unit that sets the generated first character string data to the communication control unit as a network name;
a storage unit that stores second character string data for identifying the wireless communication device; and
a selection unit that is capable of selecting a first mode in which the generated first character string data is set to the communication control unit as the network name, and a second mode in which the stored second character string data is set to the communication control unit as the network name, wherein the setting unit sets the generated first character string data to the communication control unit as the network name when the first mode is selected in the selection unit.

2. The wireless communication device according to claim 1, wherein the wireless communication device is a wireless unit detachably connected to the work vehicle via a connector.

3. The wireless communication device according to claim 1, wherein the acquisition unit acquires the work vehicle identification information after starting the work vehicle, the generation unit generates the first character string data based on the acquired work vehicle identification information, and when the generated first character string data is different from the network name already set in the communication control unit, the setting unit sets the generated first character string data to the communication control unit.

4. The wireless communication device according to claim 1, wherein the acquisition unit transmits a request signal for requesting transmission of the work vehicle identification information to the work vehicle information control unit of the work vehicle via the onboard network before acquiring the work vehicle identification information.

5. The wireless communication device according to claim 1, wherein the acquisition unit acquires the work vehicle identification information that is periodically transmitted from the work vehicle information control unit of the work vehicle to the onboard network.

6. The wireless communication device according to claim 1, wherein the communication control unit, after setting the network name by the setting unit, periodically broadcasts information including the set network name as information that the portable terminal can receive.

7. A work vehicle, comprising:

a work vehicle main body that includes an onboard network and a storage unit that is connected to the onboard network and stores work vehicle identification information for identifying the work vehicle; and the wireless communication device according to claim 1.

8. A wireless communication system of a work vehicle, comprising:

the work vehicle according to claim 7; and a portable terminal that is wirelessly connected to the work vehicle via the wireless communication device.

9. A wireless communication device, comprising:

a communication control unit that wirelessly connects a work vehicle and a portable terminal;

an acquisition unit in connection with an onboard network of the work vehicle, that acquires work vehicle identification information for identifying the work vehicle from the work vehicle;

a generation unit that generates first character string data based on the work vehicle identification information; and a setting unit that sets the generated first character string data to the communication control unit as a network name, wherein the acquisition unit acquires the work vehicle identification information after starting the work vehicle, the generation unit generates the first character string data based on the acquired work vehicle identification information, and when the generated first character string data is different from the network name already set in the communication control unit, the setting unit sets the generated first character string data to the communication control unit.

10. The wireless communication device according to claim 9, further comprising:

a storage unit that stores second character string data for identifying the wireless communication device; and a selection unit that is capable of selecting a first mode in which the generated first character string data is set to the communication control unit as the network name, and a second mode in which the stored second character string data is set to the communication control unit as the network name, wherein the setting unit sets the generated first character string data to the communication control unit as the network name when the first mode is selected in the selection unit.

11. The wireless communication device according to claim 9, wherein the wireless communication device is a wireless unit detachably connected to the work vehicle via a connector.

12. The wireless communication device according to claim 9, wherein the acquisition unit transmits a request signal for requesting transmission of the work vehicle identification information to the work vehicle information control unit of the work vehicle via the onboard network before acquiring the work vehicle identification information.

13. The wireless communication device according to claim 9, wherein the acquisition unit acquires the work vehicle identification information that is periodically transmitted from the work vehicle information control unit of the work vehicle to the onboard network.

14. The wireless communication device according to claim 9, wherein the communication control unit, after setting the network name by the setting unit, periodically broadcasts information including the set network name as information that the portable terminal can receive.

* * * * *